W. O. BUNNELL & Q. A. GATES.
AUTOMOBILE WHEEL GUARD.
APPLICATION FILED SEPT. 13, 1916.
1,239,347.
Patented Sept. 4, 1917.
Fig. 1.
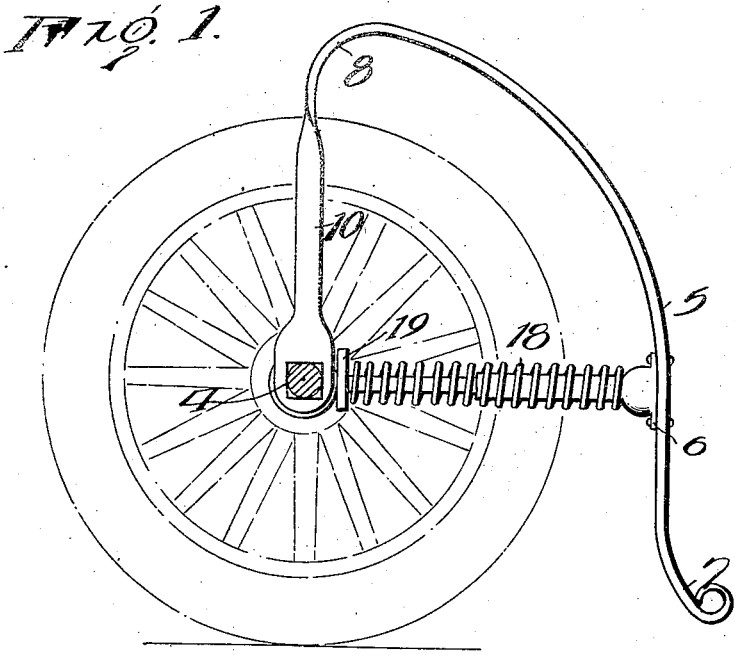
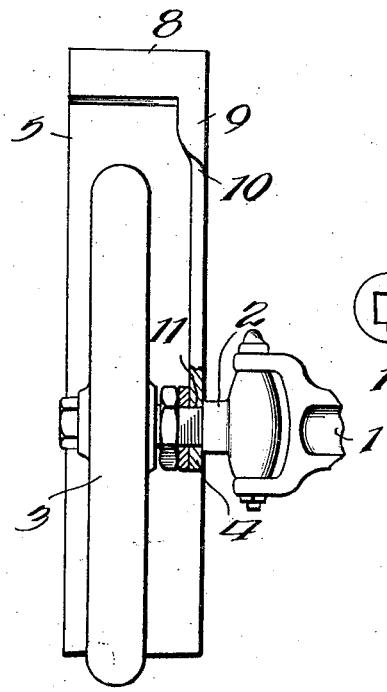
Fig. 2.
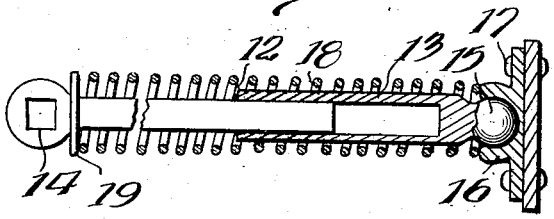
Fig. 3.
William O. Bunnell,
Quincy A. Gates,
Inventors
By Geo. P. Kimmel.
Attorney

UNITED STATES PATENT OFFICE.

WILLIAM O. BUNNELL AND QUINCY A. GATES, OF WILKES-BARRE, PENNSYLVANIA.

AUTOMOBILE-WHEEL GUARD.

1,239,347. Specification of Letters Patent. Patented Sept. 4, 1917.

Application filed September 13, 1916. Serial No. 119,872.

*To all whom it may concern:*

Be it known that we, WILLIAM O. BUNNELL and QUINCY A. GATES, citizens of the United States, and residents of Wilkes-Barre, in the county of Luzerne and State of Pennsylvania, have invented certain new and useful Improvements in Automobile-Wheel Guards, of which the following is a specification.

The present invention relates to motor vehicles and has particular reference to new and useful improvements in wheel guards therefor.

The primary object of our invention is to provide a wheel guard or fender which may be quickly and easily applied in position for use, the same being adapted to guard off persons and obstructions which may come into contact with the same to prevent the wheels from passing over a person or the like.

Another object of our invention is to provide a wheel guard of the class described which is adapted to move with the wheel upon negotiating a turn so that the wheel is guarded at all times regardless of its position.

A further object of our invention is to provide a wheel guard of the class described which, by slightly modifying the usual construction of stub axle, may be quickly and easily applied to and removed from a wheel.

A still further object of our invention is to provide a wheel guard which is constructed of yieldable material so that shocks imparted thereto will be readily absorbed and persons struck by the guard will not be injured by the same but merely thrown to one side away from the path of the wheel.

Other objects and advantages to be derived from the use of our improved wheel guard will appear from the following detail description and the claims, taken with an inspection of the accompanying drawing, in which:

Figure 1 is a side elevational view of an automobile steering wheel showing our improved wheel guard applied thereto;

Fig. 2 is a rear end elevational view of the same; and

Fig. 3 is an enlarged longitudinal sectional view of the shock absorbing elements.

Referring more particularly to the drawing wherein similar characters of reference designate like and corresponding parts throughout the various views, 1 designates the front axle of a motor vehicle having the usual stub axle 2 pivoted thereon. One of the steering wheels is designated 3 and is mounted on the other free end of the stub axle 2. The stub axle 2 is provided with a square shoulder 4, a portion of the stub axle between the shoulder and the wheel being threaded for a purpose which will hereinafter appear.

The wheel guard of our invention includes a resilient sheet of metal 5 curved so as to conform to a wheel and having a vertical portion 6 and a foot portion 7. The sheet 5 is curved downwardly as at 8 to form a spring portion. The body 5 is reduced to form an arm 9, said arm being twisted at 10 and provided with a squared opening 11 for reception of the squared shoulder 4, on the stub axle 2.

A shock absorbing element is provided composed of a rod section 12 and a tube section 13, the former being received within the latter. The rear end of the rod 12 is enlarged and provided with a squared opening 14 for engagement with the squared shoulder 4 on the axle 2. The free end of the tube 13 is provided with a ball 15 receivable in a socket 16 riveted as at 17 to the inner face of the guard member 5. A curved spring 18 surrounds the rod 12 and tube 13 as best shown in Fig. 3, a washer 19 carried by said rod 12 serving to abut one end of the spring the opposite end of said spring abutting the socket 16.

The squared shoulder 4 maintains the rod in operative position preventing the same from dropping down into engagement with the ground over which the wheel is passing. It will be seen that when the guard 5 contacts with an object the shock incident to such contact is readily absorbed by the spring 18, the curved portion 8 of the guard readily flexing to permit distortion of the guard under strain. We desire to call attention to the fact that when the wheel 3 is turned to negotiate a curve in the roadway the guard member will be turned with the wheel effectively preventing contact of persons with the wheel at all times.

From the above description taken in connection with the accompanying drawing, it is thought that a clear and comprehensive understanding of the construction, operation and advantages of our invention may be had, and while we have shown and described the device as embodying a specific structure, we desire that it be understood that such changes may be made in said structure as do not depart from the spirit and scope of the invention as claimed.

Having thus fully described our invention, what we claim as new and desire to secure by Letters Patent, is:—

1. In a device of the character described, the combination with an axle having a steering spindle and steering wheel thereon, of a guard composed of a curved body having an arm, said arm connecting to the steering spindle, and shock absorbing means extending between the guard and said spindle.

2. In a device of the character described, the combination with an axle having a pivoted stub portion extending therefrom, a steering wheel on said stub portion, of a guard including a flexible body for disposition in front of the wheel, said body being reduced and twisted to form a supporting arm, said stub axle having a squared shoulder to be engaged by the lower free end of said arm, and a telescopic spring controlled shock absorber interposed between said stub axle and the body of the guard.

3. In a device specified, the combination with a stub axle and steering wheels, said stub axle having a squared shoulder thereon, of a wheel guard composed of a resilient body adapted to be disposed in front of said wheel and having an arm extending downwardly therefrom, said arm being provided with a squared opening to engage the shoulder on the stub axle, a rod and tube telescopically related, said rod and tube being connected to said stub axle and the body of the guard, respectively, and a coil spring element interposed between the stub axle and said body to absorb shocks imparted to the latter.

4. In a wheel guard, a body provided with an arm, said body being curved to provide an object engaging portion, said arm having a spring portion, shock absorbing means interposed between said arm and the body of the guard composed of telescopically related sections, and a coil spring surrounding said sections to absorb shock imparted to the body of the guard.

In testimony whereof, we affix our signatures hereto.

WILLIAM O. BUNNELL.
QUINCY A. GATES.

Copies of this patent may be obtained for five cents each, by addressing the "Commissioner of Patents, Washington, D. C."